(12) United States Patent
Horowitz et al.

(10) Patent No.: US 7,136,394 B2
(45) Date of Patent: Nov. 14, 2006

(54) LOW-DELAY VIDEO ENCODING METHOD FOR CONCEALING THE EFFECTS OF PACKET LOSS IN MULTI-CHANNEL PACKET SWITCHED NETWORKS

(75) Inventors: Michael Horowitz, Austin, TX (US); Rick Flott, Austin, TX (US); Athar Shah, Austin, TX (US); Kevin Raper, Austin, TX (US)

(73) Assignee: Polycom, Inc., Pleasanton, CA (US)

( * ) Notice: Subject to any disclaimer, the term of this patent is extended or adjusted under 35 U.S.C. 154(b) by 933 days.

(21) Appl. No.: 10/098,849

(22) Filed: Mar. 12, 2002

(65) Prior Publication Data

US 2002/0126668 A1  Sep. 12, 2002

(51) Int. Cl.
    *H04L 12/56* (2006.01)
(52) U.S. Cl. .................... 370/468; 370/468
(58) Field of Classification Search ........ 370/464–465, 370/468, 474, 229, 230
    See application file for complete search history.

(56) References Cited

U.S. PATENT DOCUMENTS

| | | | |
|---|---|---|---|
| 5,168,356 A | | 12/1992 | Acampora et al. |
| 5,825,430 A | * | 10/1998 | Adolph et al. ............... 348/487 |
| 6,014,694 A | | 1/2000 | Aharoni et al. |
| 6,104,441 A | | 8/2000 | Wee et al. |
| 6,141,486 A | | 10/2000 | Lane et al. |
| 6,148,005 A | * | 11/2000 | Paul et al. .................. 370/469 |
| 6,167,083 A | | 12/2000 | Sporer et al. |
| 6,646,674 B1 | * | 11/2003 | Kato ........................ 348/14.13 |

| | | |
|---|---|---|
| 2002/0164024 A1 | 11/2002 | Arakawa et al. |

FOREIGN PATENT DOCUMENTS

| | | |
|---|---|---|
| EP | 0 763 944 A2 | 3/1997 |
| EP | 0 874 525 A2 | 10/1998 |
| EP | 0 996 291 A1 | 4/2000 |
| WO | 99/07159 | 2/1999 |
| WO | 02/17637 A1 | 2/2002 |
| WO | 02/052860 A1 | 7/2002 |

OTHER PUBLICATIONS

Tudor, P.N. MPEG-2 Video Compression. IEEE. Dec. 1995. pp. 257-264.*
Search Report received in corresponding European application No. EP 02 72 5208 dated Apr. 26, 2006.
Aravind R et al: "Packet Loss Resilience of MPEG-2 Scalable Video Coding Algorithms" IEEE Transaction s on Circuits and Systems for Video Technology, IEEE Service Center, Piscataway, NY, US, vol. 6, No. 5, Oct. 1, 1996 pp. 426-435, XP000627031.
Wenger S Ed-Wong P W et al: "Temporal Scalability Using P-pictures for Low-Latency Applications" Multimedia Signal Processing, 1998 IEEE Second Workshop on Redondo Beach, CA, USA Dec. 7, 1998; pp. 559-564, XP010318327.
Richardson I E G et al: MPEG Coding for Error-Resilient Transmission International Conference on Image Processing and Its Applications, London, GB, No. 140, 1995, pp. 559-563, XP000869826.

* cited by examiner

*Primary Examiner*—Derrick Ferris
(74) *Attorney, Agent, or Firm*—Wong, Cabello, Lutsch, Rutherford & Brucculeri, LLP (57) ABSTRACT

A method for encoding digital video with low delay for transport on a multi-channel QoS packet-switched network using multiple reference pictures with specially designated "key frames" to minimize the undesired effects of packet loss on video quality.

18 Claims, 6 Drawing Sheets

LOW-DELAY VIDEO ENCODING METHOD FOR CONCEALING THE EFFECTS OF PACKET LOSS IN MULTI-CHANNEL PACKET SWITCHED NETWORKS

BACKGROUND OF THE INVENTION

1. Field of the Invention

The invention relates to communication of digital video signals over multi-channel packet switched networks and more particularly to a system and method for encoding and decoding video data with low delay to conceal the effects of packet loss on the quality of the video transported over such networks.

2. Description of the Prior Art

In recent years, videoconference applications have begun the transition from transporting compressed audio and video data streams over nearly lossless circuit switched networks such as POTS and ISDN phone lines to packet switched networks. On a packet switched network, data streams are partitioned into smaller data bundles called packets. Packet switched networks often have significantly higher error rates than their circuit switched counterparts.

Error associated with packet switched networks is in the form of lost packets of data, which are supposed to travel over the Internet from source node to destination node. However, given the distributed and computationally simplistic architecture of the Internet and given that the Internet transport policies are only best-effort, it is common for packets to get lost (i.e., to fail to reach their intended destination).

Packet loss in the context of videoconferencing has a negative effect on the video portions of a conference. A loss of as little as one percent of packets containing video data can make a video portion of the conference difficult to comprehend.

Top layers of network protocols can minimize packet loss by using acknowledgement and re-sending procedures. However, while acknowledgement and re-sending procedures may suffice for traditional static web content such as web pages, JPEG images, and applets, it is unsuitable for interactive video, also referred to as conversational video. Interactive video requires that a stream of sequential images arrive at a client's location at a consistent rate that allows for real-time playback with a minimum latency.

There are several methods that attempt to resolve the packet loss and delay problems associated with interactive video by using prioritization and reservation of network resources via Quality of Service (QoS) enabled networks. These methods, including IP Precedence, Diff-Serv, RSVP, and MPLS, can be used to prioritize audio/video data over non-real time traffic (e.g., HTTP and FTP). Another QoS network method and one that provides context for the present invention, uses a multi-channel system that requires compressed video data to be divided and transported over separate channels. In addition, one or more of these channels are guaranteed to have a very low packet loss rate. Typically these high quality channels represent a small fraction of a total bandwidth of the channel. For a multi-channel QoS approach to be effective, it is necessary for the video encoder to make encoding decisions that exploit the special nature of a multi-channel QoS network.

Figure 1:
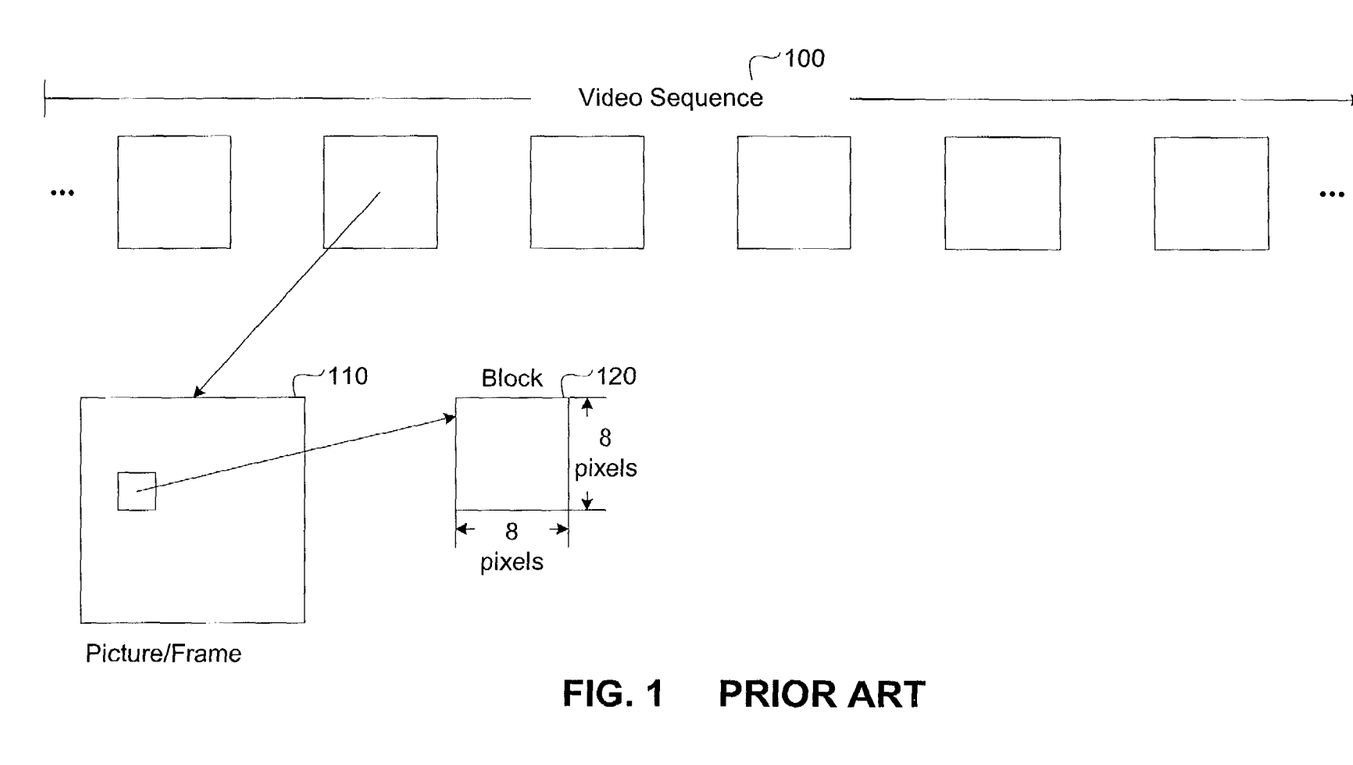
FIG. 1 depicts the interrelationship among video sequences, frames, blocks, and pixels.

Video encoding algorithms in use today, such as MPEG, MPEG2, MPEG4, H.261, and H.263 employ techniques that are based on a concept of a block. FIG. 1 depicts a relationship, in these common encoding algorithms, between a video sequence 100, an individual video picture/frame 110, and a constituent block 120. The video sequence 100 is composed of the individual frames 110. The frame 110 is subsequently composed of a grid of blocks 120, which preferably are 8 pixel by 8 pixel fragments of the frame 110. Alternatively, video encoding algorithms may employ techniques based on a concept of a macroblock, a collection of six blocks (not shown). Four blocks are spatially situated to cover a 16 pixel by 16 pixel fragment of the frame 110 containing luminance information and two blocks contain chrominance information.

Figure 2:
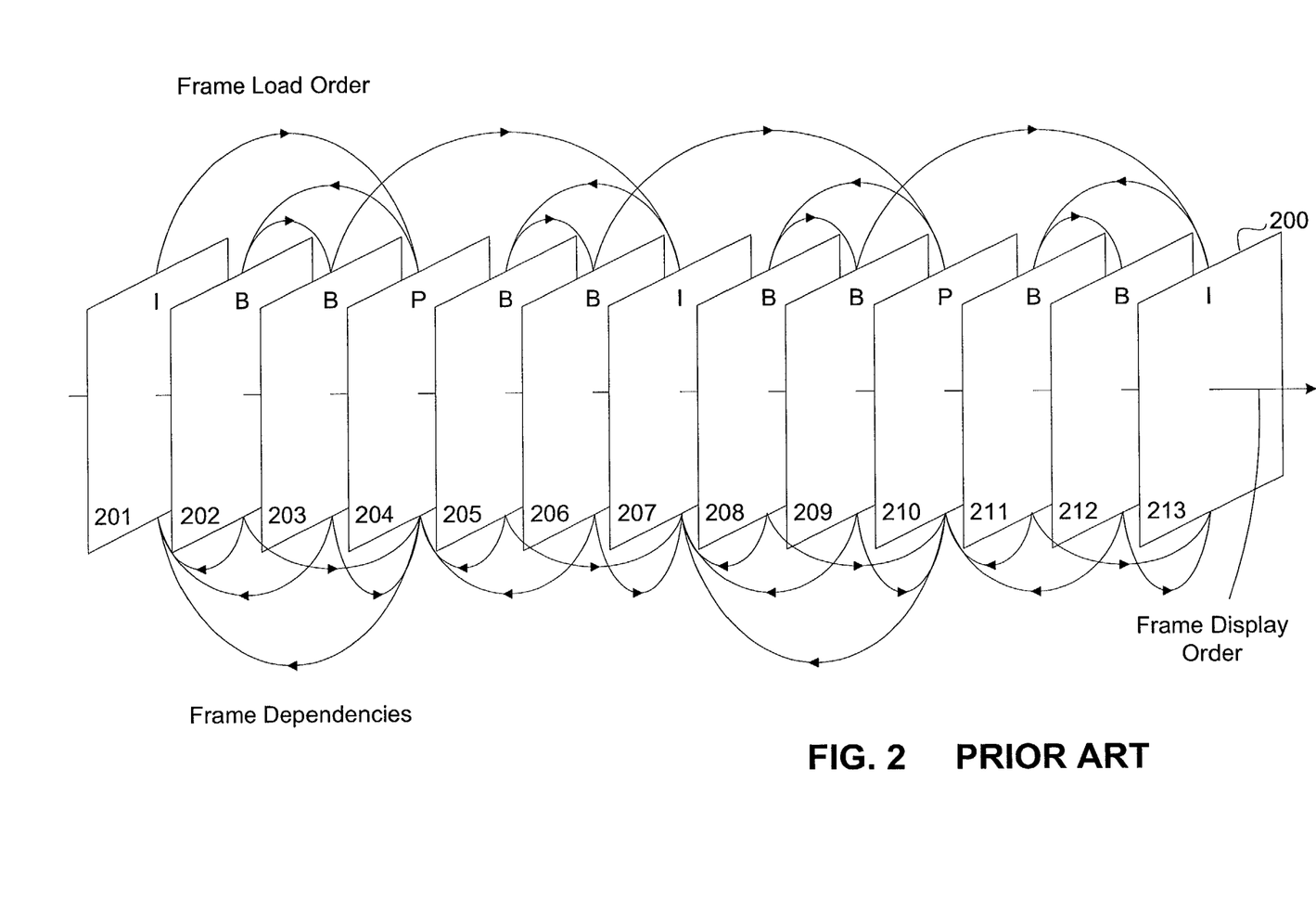
FIG. 2 depicts some of the critical concepts in the video encoding art.

FIG. 2 depicts some critical concepts in the video encoding art. A depicted video sequence 200 comprises of individual frames 201 through 213. The frames 201–213, in their most elemental form, are conglomerations of pixel values (values measuring color and luminosity of an individual pixel). To store and transport the frames 201–213 in terms of pure pixel values requires memory and bandwidth amounts that exceed practical limits for real-time playback of a video sequence over a network. Encoding methods address this problem, in part, by taking advantage of spatial and temporal redundancies present in the sequence of the frames 201–213. In other words, pixel values are not independent and random with respect to each other, neither within a frame nor across frames. Rather, pixel values correlate with pixel values that are proximate in the frame (spatial predictability) and across frames (temporal predictability). This nature of frame sequences makes it possible to develop encoding algorithms that can reduce the memory and bandwidth requirements by substituting predicated frames for the full pixel valued frames.

Frames are encoded (i.e., converted from a pixel-valued-format to a compressed format) on the basis of individual blocks 120 (FIG. 1) or macroblocks (not shown). The blocks 120 of the frame 110 (FIG. 1) are encoded with either a transform technique or a motion compensation/transform technique.

The transform technique is used where the blocks 120 cannot be predicted from a previous set of blocks (e.g., a scene cut). A frame encoded with the transform technique is referred to as an intra-picture or I frame because all compression is derived solely from intra-frame/spatial predictability, as opposed to inter-frame/temporal predictability.

Alternatively, the motion compensation/transform technique, also simply referred to as motion compensation, is used to encode blocks 120 in a manner that eliminates temporal redundancy (i.e., exploits the predictability of blocks across frames). This motion compensation substitutes a block's pixel values with a motion vector (that points from the block being coded to a reference block with a similar pixel arrangement) and transform coded residual terms (which are the content difference between the chosen reference block and the block being coded). For example, frames, which are coded with the motion compensation/transform technique, are referred to as B frames and predicted (P) frames. P frames use only previous frames for reference. B frames use both previous and subsequent P or I frames for reference. The advantage of using B frames over P frames is that B frames produce, in general, a more accurate frame prediction thereby increasing coding efficiency. The disadvantage of using B frames is the playback delay caused by having to load subsequent P or I frames before a B frame can be decoded and rendered for the viewer.

Referring back to FIG. 2, the exemplary video sequence 200 is depicted where frames 201 through 213 are displayed in sequential order. The frames 201, 207, and 213 are I frames. The frames 202, 203, 205, 206, 208, 209, 211, and 212 are B frames. The frames 204 and 210 are P frames.

Thus, the frame 202 is dependent on both frames 201 and 204. The frame 204 is dependent on the frame 201. Given these frame dependencies, the frames 201–204 must be loaded into a decoder in the following order: 201, 204, 202, and 203. Arrows in FIG. 2 depict a similar frame dependency and frame load order for the remaining frames 205–213. FIG. 2 serves to illustrate how B frames introduce video playback latency, because B frames can be loaded and played only after first loading subsequent frame dependencies.

When a packet containing video is lost, the decoder encounters an error. In most encoder-decoder (codec) implementations, these decoder errors will propagate to succeeding video pictures until an intra-picture is loaded and decoded. Video conferencing uses a fixed bit rate, and since intra-pictures require many more bits to encode than non-intra-pictures, the intra-pictures are sent much less frequently. Indeed, in many implementations of H.261 and H.263, intra-pictures are sent only when a decoder error occurs and the decoder has signaled the encoder to send an intra-picture. This error handling strategy produces good results only in low loss networks, but not in packet switched networks.

In light of the detrimental effects of packet loss or delay on encoded video data, there exists a need in the art of videoconferencing for a method to minimize the effect of packet loss on video without adding delay to the received video. The present invention provides a method and system for encoding video with low delay for transport over a multi-channel QoS packet switched network so as to exploit special properties of that network.

SUMMARY OF THE INVENTION

Advantageously, the present invention provides a system and method for encoding a video sequence with low delay for transport over a multi-channel QoS packet switched network so as to minimize the effect of packet loss on video quality. The system of the present invention includes a system encoder, a system packetizer, a high quality network channel on which packet loss is assumed to be negligible, and a lower quality network channel. The system encoder encodes a video stream into a sequence of key-frames and non-key frames. In an exemplary embodiment of the present invention, a key-frame is preferably an inter-frame that is motion compensated from a previous key frame, and non-key frames are inter-frames dispersed between the key frames. Preferably, each non-key inter frame is motion compensated from a nearest previous key frame. However, in general, the non-key inter frame may be motion compensated from any previous frame back to and including the most recent previous key frame. Therefore, a network error occurring in a given non-key frame prior to the most recent previous key frame will not propagate past the most recent previous key frame. The system packetizer packetizes the key frames and the non-key frames, and sends the key frames to the high quality network channel and the non-key frames to the lower quality network channel for transmission.

In one embodiment of the present invention, the system encoder employs a bit allocation strategy where more bits are allocated to frames which are temporally more distant from the current key frame and more bits are allocated to frames as bandwidth of the multiple-channel network increases. Key frames receive the most bits subject to the constraints that the data rate of the key pictures is less than or equal to the bandwidth of the high quality channel and the overall bit rate is on average less than or equal to the total bandwidth of the multi-channel network.

In an exemplary embodiment of the present invention, the spacing between key frames in the sequence of key frames and non-key frames is a function of the bandwidth available on the high quality network channel. The key frame spacing and bit allocation strategy adapt quickly to changes in channel bandwidth.

These and other features of the invention, as well as additional objects, advantages, and other novel features of the invention, will become apparent to those skilled in the art upon reading the following details.

DETAILED DESCRIPTION OF THE EXEMPLARY EMBODIMENTS

The present invention relates to a method and system for encoding digital video signals with low delay for transport on a multi-channel QoS packet-switched network so as to minimize the effect of packet loss on video without adding delay to the received video.

Figure 3:
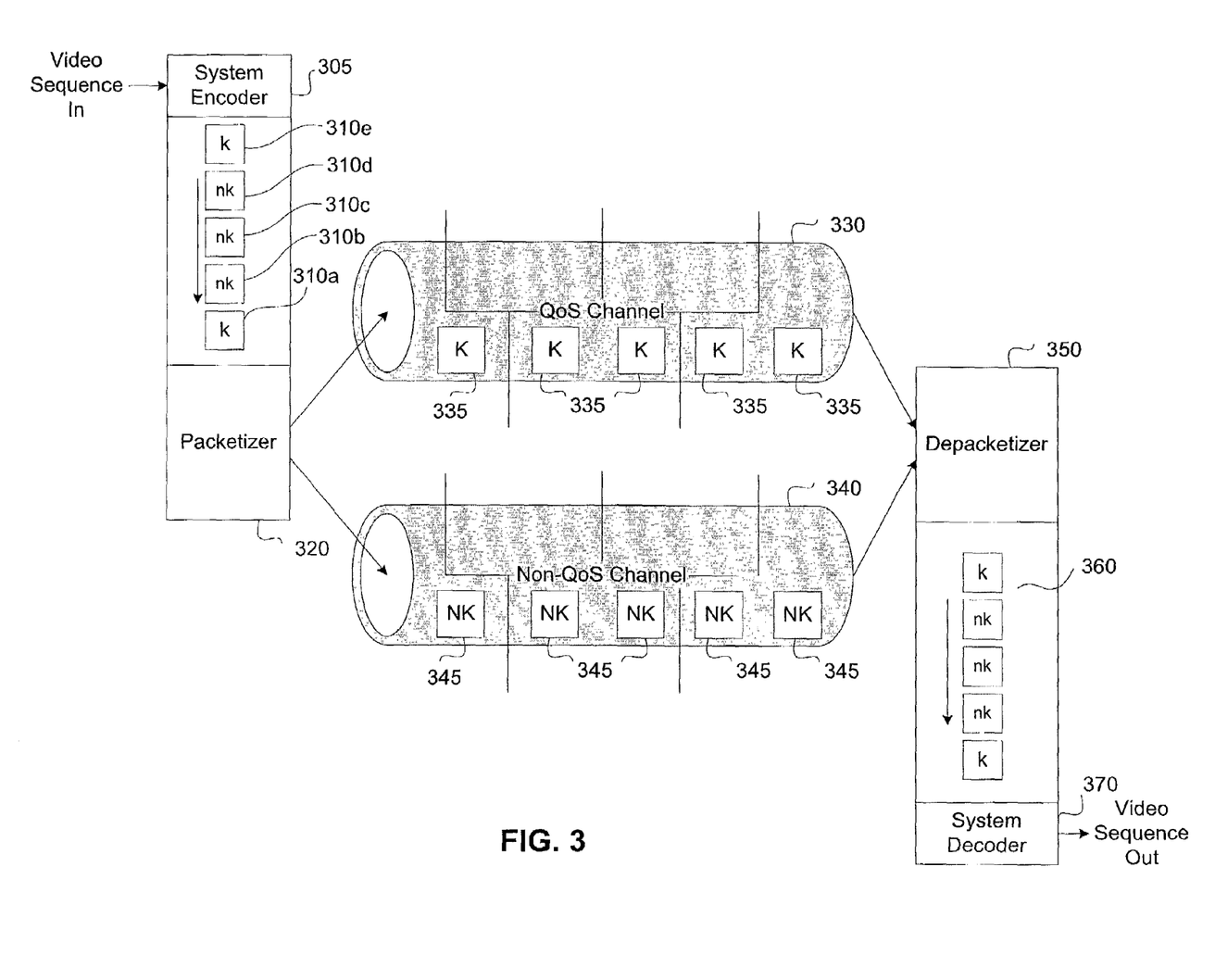
FIG. 3 depicts an end-to-end encoding and decoding interactive video system, according to the present invention.

FIG. 3 illustrates two exemplary aspects of the present invention. First, FIG. 3 depicts an end-to-end encoding and decoding interactive video system that embodies aspects of the present invention. A system encoder 305, located at one network node, encodes a received video sequence into key frames and non-key frames represented by a bit sequence 310. Bit sequence 310 includes bit 310*a* and bit 310*e* representing key frames and bits 310*b*–310*d* representing non-key frames. In an exemplary embodiment of the present invention, a key frame is preferably an inter-frame that is motion compensated from a previous key frame, and non-key frames are inter-frames dispersed between the key frames. Preferably, each non-key inter frame is motion compensated from a nearest previous key frame. However, in general, the non-key inter frame may be motion compensated from any previous frame back to and including a most recent previous key frame. Therefore, a network error occurring in a given non-key frame prior to the most recent previous key frame will not propagate past the most recent previous key frame.

A system packetizer 320 converts the bit sequence 310 into network packets that are transported over two types of network channels, a high quality network channel, such as a QoS channel 330, and a lower quality non-QoS channel 340. Although FIG. 3 shows the high quality channel as the QoS channel 330, the scope of the present invention covers other high quality network channels. At another network node, a system depacketizer 350 converts the network packets into a bit sequence 360. A system decoder 370 decodes the bit sequence 360 into an output video sequence that is played back in real-time.

As shown, one aspect of the present invention is the non-use of B frames in the video sequence 310. While the prior art uses B frames to reduce encoding error, the present invention addresses encoding error problems with alternate means and, thereby, reduces the playback latency associated with B frames. A further aspect of the present invention as shown in FIG. 3 is the separation for transport of packets into key frame packets (K) 335 and non-key frame packets (NK) 345. Thus, the QoS channel 330 only transports a series of key frame packets 335 and the non-QoS channel 340 only transports a series of non-key frame packets 345.

Figure 4:
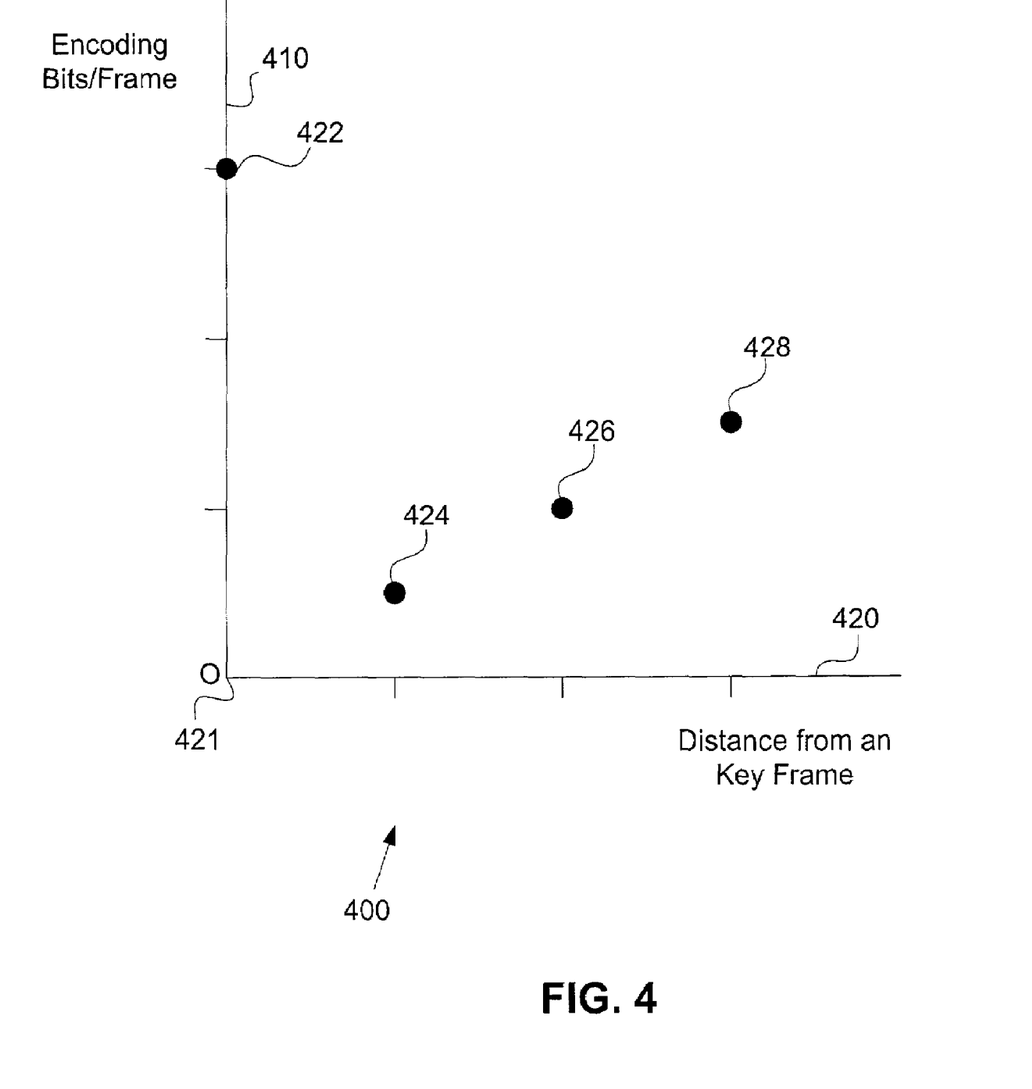
FIG. 4 depicts one embodiment of the number of encoding bits per frame versus a frame's distance from a preceding key frame, according to the present invention.

FIG. 4 illustrates an exemplary embodiment of a number of encoding bits per frame versus a frame's distance from a preceding key frame. Plot 400 has a y-axis 410, which represents a number of bits that will be used to encode any given frame, an x-axis 420, which represents an incremental distance any given frame has from the preceding key frame, and an origin (O) 421 located at an intersection of the x-axis 420 and the y-axis 410. For example, in the video sequence received by the system encoder 305 of FIG. 3, a key frame (not shown) received by the system encoder 305 is represented by a point 422. Similarly, a first subsequent frame received is represented by a point 424, a second subsequent frame received is represented by a point 426, and a third subsequent frame received is represented by a point 428. The exemplary element of the invention revealed in FIG. 4 is the allocation of increased encoding bits to the key frames as opposed to non-key frames and the increasing allocation of bits to non-key frames the greater their distance from the prior key frame. Since more bits are allocated to the key frames, a given key frame may accurately predict subsequent non-key frames and a subsequent key frame, thereby improving video quality in the given key frame. In addition, the number of bits used to encode any given frame is also dependent on amount of available bandwidth. The greater the available bandwidth, the greater the number of bits that will be used to encode the video frames. For example, the number of bits used to encode a key frame is a function of bandwidth available on the high quality network channel, and the number of bits used to encode a non-key frame is a function of bandwidth available on the lower quality network channel.

Figure 5:
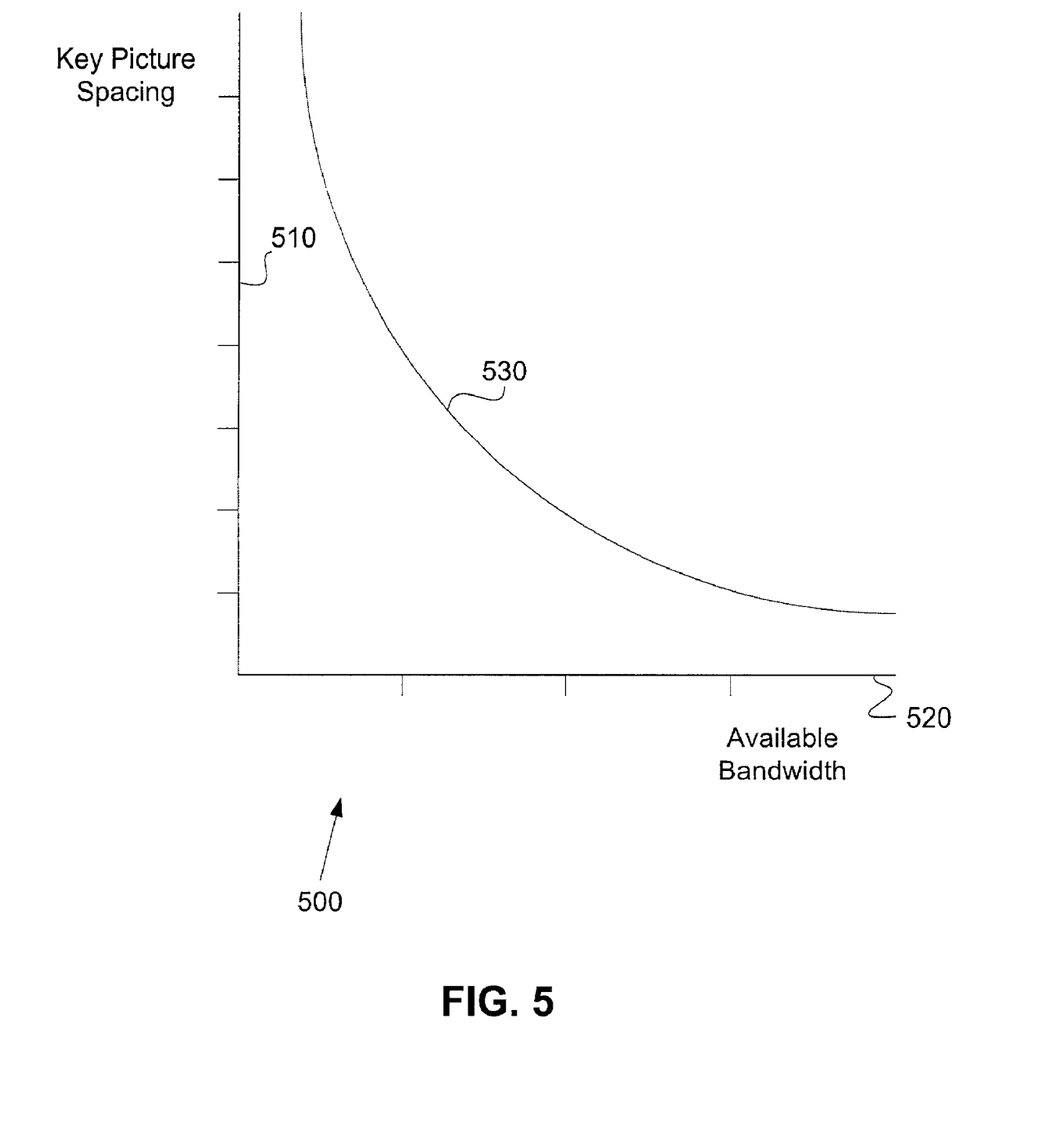
FIG. 5 depicts one embodiment of key frame spacing versus available bandwidth, according to the present invention.

FIG. 5 illustrates an exemplary embodiment of key picture spacing versus available bandwidth. Plot 500 has a y-axis 510, which represents an amount of key picture spacing. In other words, the y-axis 510 represents an integral number of non-key pictures that will be interspersed between key pictures. Plot 500 also has an x-axis 520, which represents bandwidth available for transporting packets of data over a network used for interactive video. As shown by a curve 530, the key picture spacing is dependent on the amount of available bandwidth. The greater the available bandwidth on the high quality network channel, the less the amount of spacing used between key frames. Key frames are encoded with more bits than non-key frames, so greater key frame spacing translates to lower bandwidth requirements. The scope of the present invention covers any functional relationship that shows the key picture spacing decreasing as the available bandwidth on the high quality network channel 330 increases.

Figure 6:
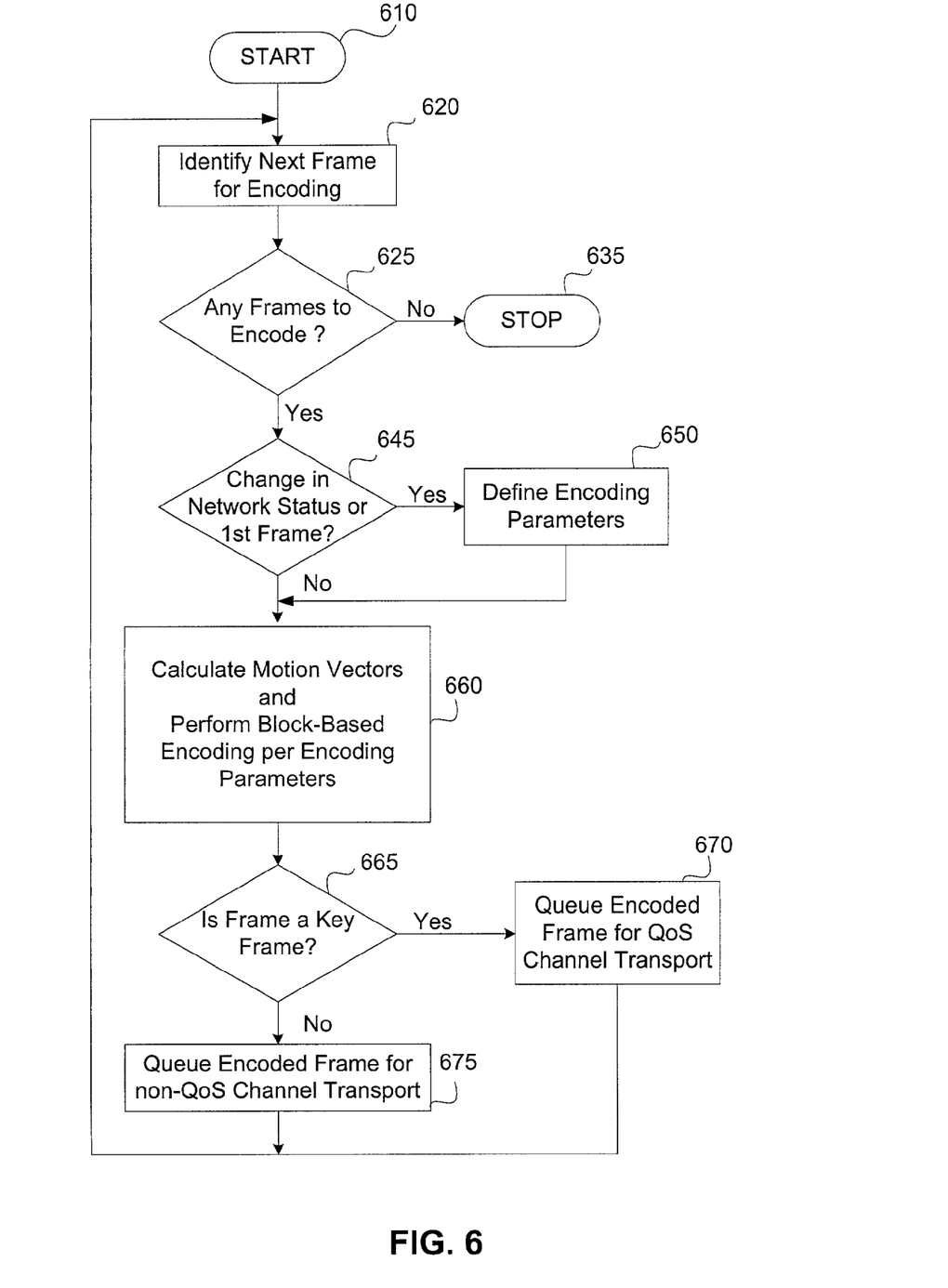
FIG. 6 is a flowchart of method steps for encoding a video sequence, according to one embodiment of the present invention.

FIG. 6 is a flowchart of method steps for encoding a video sequence, according to an exemplary embodiment of the present invention. The method commences in step 610 and proceeds to step 620 where the system encoder 305 (FIG. 3) identifies a next frame for encoding within a video sequence. On a first pass of the method steps, the next frame for encoding is the first frame in the video sequence. In step 625, the system encoder 305 determines if any frames for encoding exist. If no frames for encoding exist, then in step 635, the method terminates. Alternatively, if in step 625 a frame for encoding does exist, then in step 645, the system encoder 305 determines if a change in network status exists or if the frame for encoding is the first frame in the video sequence.

If in step 645 either a network status change exists or the frame for encoding is the first frame in the video sequence, then in step 650, the system encoder 305 defines encoding parameters and the method continues at step 660. The system encoder 305 defines initial encoding parameters if the frame is the first frame in the video sequence. Alternatively, the system encoder 305 defines new encoding parameters if a change in network status exists. Encoding parameters include a key picture spacing parameter defining a number of integral non-key frames between two consecutive key frames and an array of bit density parameters defining a number of bits per frame for a plurality of frames. The key picture spacing parameter depends upon available network bandwidth, and each bit density parameter associated with a frame depends upon the frame's position with respect to a preceding key frame and upon the available network bandwidth. Referring back to step 645, if the system encoder 305 determines that either a network status change does not exist or the frame is not the first frame of the video sequence, then step 650 is bypassed and the method continues at step 660.

In step 660, the system encoder 305 calculates motion vectors associated with the blocks of the frame and subsequently performs block-based encoding per the defined encoding parameters. The system encoder 305 then determines if the encoded frame is a key frame in step 665. If the encoded frame is a key frame, then in step 670, the system encoder 305 queues the encoded frame for transport over the high quality network channel. Alternatively, if in step 665 the encoded frame is a not a key frame, then in step 675, the system encoder 305 queues the encoded frame for transport over the lower quality network channel. The method continues at step 620 and is repeated until the system encoder 305 encodes all the frames in the video sequence.

The method of the invention advantageously minimizes the disturbance due to packet loss on coded digital video signals transported on a multi-channel QoS packet-switched network without the addition of end-to-end delay.

While the invention has been described herein with reference to exemplary embodiments, they are for illustrative purposes only and not intended to be limiting. Therefore, those skilled in the art will recognize that other embodiments can be practiced without departing from the scope and spirit of the claims set forth below.

What is claimed is:

1. A method of encoding and transporting interactive video, comprising the steps of:
    receiving a video sequence;
    encoding the video sequence into key frames represented by key frame bit sequences and non-key frames represented by non-key frame bit sequences, wherein a number of bits used to encode a frame is a function of an integral distance between the frame and a nearest preceding key frame;
    packetizing and transporting the key frame bit sequences over a high quality network channel; and
    packetizing and transporting the non-key frame bit sequences over a lower quality network channel.

2. The method of claim 1, wherein the non-key frames exclude bi-directionally predicted frames.

3. The method of claim 1, wherein the non-key frames include predicted frames.

4. The method of claim 1, wherein the key frames are inter-frames.

5. The method of claim 1, wherein the key frames are intra-frames.

6. The method of claim 1, wherein a number of bits used to encode a frame is a function of bandwidth available on a corresponding channel.

7. The method of claim 1, wherein spacing between key frames in the sequence of key frames is a function of bandwidth available on the high quality network channel.

8. The method of claim 1, wherein the high quality network channel is a Quality of Service channel.

9. A system for encoding and transporting interactive video, comprising:
- a system encoder for encoding a video stream into key frames represented by key frame bit sequences and non-key frames represented by non-key frame bit sequences, wherein a number of bits used to encode a frame is a function of an integral distance between the frame and a nearest preceding key frame;
- a system packetizer coupled to the system encoder for packetizing the key frame bit sequences and the non-key frame bit sequences;
- a high quality network channel coupled to the system packetizer for transporting the packetized key frame bit sequences; and
- a lower quality network channel coupled to the system packetizer for transporting the packetized non-key frame bit sequences.

10. The system of claim 9, wherein the non-key frames exclude bi-directionally predicted frames.

11. The system of claim 9, wherein the non-key frames include predicted frames.

12. The system of claim 9, wherein the key frames are inter-frames.

13. The system of claim 9, wherein the key frames are intra-frames.

14. The system of claim 9, wherein a number of bits used to encode a frame is a function of bandwidth available on a corresponding channel.

15. The system of claim 9, wherein spacing between key frames in the sequence of key frames is a function of bandwidth available on the high quality network channel.

16. The system of claim 9, wherein the high quality network channel is a Quality of Service channel.

17. A system for encoding and transporting interactive video on multiple-network channels, comprising:
- a system encoder for encoding a video stream into key frames and non-key frames, spacing between consecutive key frames based on bandwidth available on the multiple-network channels, and a number of bits used to encode any given frame based on an integral distance between the given frame and a nearest preceding key frame and the bandwidth available on the multiple-network channels;
- a system packetizer for packetizing key bits representing the key frames and non-key bits representing the non-key frames, coupled to the system encoder;
- a high quality network channel for transporting the packetized key bits, coupled to the system packetizer; and
- a network channel of the multiple-network channels for transporting the packetized non-key bits, coupled to the system packetizer.

18. A system for encoding and transporting interactive video on multiple-network channels, comprising:
- a means for encoding a video stream into key frames and non-key frames, the spacing between consecutive key frames based on bandwidth available on the multiple-network channels, and a number of bits used to encode any given frame based on an integral distance between the given frame and a nearest preceding key frame and the bandwidth available on the multiple-network channels;
- a means for packetizing key bits representing the key frames and the non-key bits representing the non-key frames, coupled to the means for encoding;
- a first means for providing high quality transportation of the packetized key bits, coupled to the means for packetizing; and
- a second means for providing lower quality transportation of the packetized non-key bits, coupled to the means for packetizing.

* * * * *